(12) United States Patent
Sampe

(10) Patent No.: US 6,601,991 B2
(45) Date of Patent: Aug. 5, 2003

(54) ROLLER DEVICE FOR AN IMAGE TRANSFERRING DEVICE

(75) Inventor: Atsushi Sampe, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/953,922

(22) Filed: Sep. 18, 2001

(65) Prior Publication Data

US 2002/0034348 A1 Mar. 21, 2002

(30) Foreign Application Priority Data

Sep. 19, 2000 (JP) .................................. 2000-283982

(51) Int. Cl.$^7$ ................................................ F16C 17/02
(52) U.S. Cl. ........................................................ 384/219
(58) Field of Search ................................ 384/219, 218, 384/535, 581; 399/107

(56) References Cited

U.S. PATENT DOCUMENTS

| | | | | |
|---|---|---|---|---|
| 5,212,520 A | * | 5/1993 | Toyofuku | ............... 399/107 |
| 5,614,998 A | | 3/1997 | Sanpe | |
| 5,709,481 A | * | 1/1998 | Hinojosa et al. | ............ 384/219 |

FOREIGN PATENT DOCUMENTS

| JP | 6-64279 | 8/1994 |
|---|---|---|
| JP | 2000-356217 | 12/2000 |

OTHER PUBLICATIONS

Patent Abstracts of Japan, JP 2000 250333, Sep. 14, 2000.
Patent Abstracts of Japan, JP 04 005676, Jan. 9, 1992.
Patent Abstracts of Japan, JP 07 295395, Nov. 10, 1995.

* cited by examiner

*Primary Examiner*—Lenard A. Footland
(74) *Attorney, Agent, or Firm*—Oblon, Spivak, McClelland, Maier & Neustadt, P.C.

(57) ABSTRACT

A roller device of the present invention includes a roller including a shaft, a bearing for rotatably supporting the shaft, a pressing device for pressing the bearing, and a lug protruding from the bearing in the axial direction of the roller. The pressing device is implemented as a pair of hook members deformable away from each other in a direction perpendicular to the axis of the roller.

18 Claims, 5 Drawing Sheets

ROLLER DEVICE FOR AN IMAGE TRANSFERRING DEVICE

BACKGROUND OF THE INVENTION

1. Field of the Invention

The present invention relates to a copier, printer, facsimile apparatus or similar electrophotographic image forming apparatus and more particularly to a roller device for a contact type image transferring device.

2. Description of the Background Art

A contact type image transferring device is extensively used for an electrophotographic image forming apparatus because it does not produce nitrogen oxides or similar toxic components and because it is operable with a low voltage and therefore cost effective. These advantages are not achievable with a corona discharge type image transferring device. The contact type image transferring device includes a roller device including an image transfer roller. The image transfer roller is pressed against a photoconductive drum in such a manner as to be movable substantially perpendicularly to the axis of the drum. The roller rotates while absorbing the thickness of a paper sheet or similar recording medium being conveyed as well as the eccentricity of the roller and drum. For this purpose, compression springs exert a preselected load on bearings that support opposite ends of the roller. The roller must be replaced when it wears due to aging or is contaminated in order to maintain the expected image transferring ability and conveying ability.

Japanese Patent Laid-Open Publication Nos. 5-333721 and 9-138590, for example, each propose a semicircular bearing formed with an opening and simple means for preventing a shaft from slipping out of the bearing. Although this bearing may facilitate the replacement of an image transfer roller, carrier and toner particles, as well as other impurities, are apt to enter the bearing and produce noise while increasing resistance to rotation. While Japanese Patent Laid-Open Publication No. 11-93940 discloses a similar arrangement, it needs extra means for locking and unlocking a color that prevents the shaft of a roller from slipping cut.

Technologies relating to the present invention are also disclosed in, e.g., Japanese Patent Laid-Open Publication Nos. 6-64279 and 2000-356217.

SUMMARY OF THE INVENTION

It is an object of the present invention to provide a roller device capable of facilitating the attachment and detachment of an image transfer roller with a simple configuration and accurately positioning the roller at a preselected position.

It is another object of the present invention to provide a roller device capable of cleaning the shaft of an image transfer roller over a long period of time and insuring reliable rotation of the roller.

It is a further object of the present invention to provide an image transferring device including the above roller device and an image forming apparatus including the image transferring device.

A roller device of the present invention includes a roller including a shaft, a bearing for rotatably supporting the shaft, a pressing device for pressing the bearing, and a lug protruding from the bearing in the axial direction of the roller. The pressing device is implemented as a pair of hook members deformable away from each other in.a direction perpendicular to the axis of the roller.

An image transferring device including the above roller device and an image forming apparatus including the image transferring device are also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
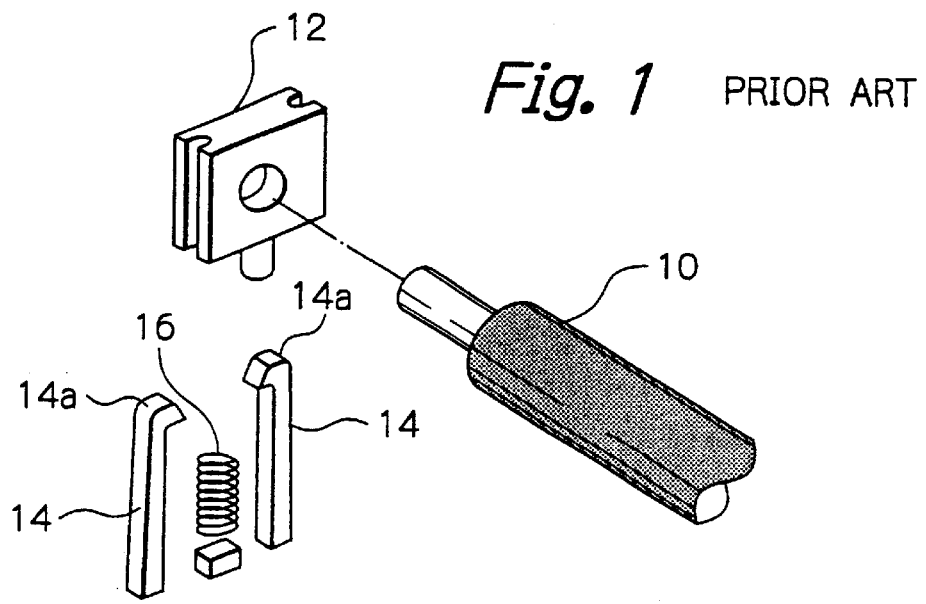
FIG. 1 is an isometric view showing a conventional roller device for an image transferring device.

To better understand the present invention, reference will be made to a conventional image transfer roller device, shown in FIG. 1. As shown, the image transfer roller device includes an image transfer roller 10 and a bearing 12 rotatably supporting the roller 10. A spring 16 presses the bearing 12 such that the roller 10 is pressed against a photoconductive element not shown. A pair of hook members 14 restrict the movement of the bearing 12 in the up-and-down direction and are formed of resin. More specifically, each hook member 14 includes a catch 14a for preventing the bearing 12 from slipping out.

The hook members 14, however, have a problem that while they must be rigid enough to retain the bearing 12, they make it difficult to attach and detach the bearing 12 and sometimes damage it if excessively rigid. Another problem is that resin forming the hook members 14 deforms due to aging and causes the bearing 12 and roller 10 to easily slip out. This is also true when the catches 14a of the hook members 14 wear due to repeated attachment and detachment. On the other hand, a driving force acts on the roller 10 via gears, not shown, during operation with the result that a force acts on the roller 10 in a direction perpendicular to the axis of the roller 10 as well. It follows that if the rigidity of the hook members 14 is short, the photoconductive dram and transfer roller 10 are brought out of parallelism, causing a paper sheet or similar recording medium to skew.

Figure 2A:
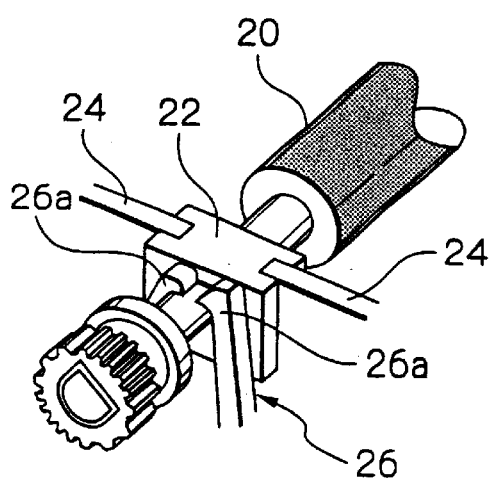
FIGS. 2A through 2C are views showing another conventional roller device.
Figure 2B:
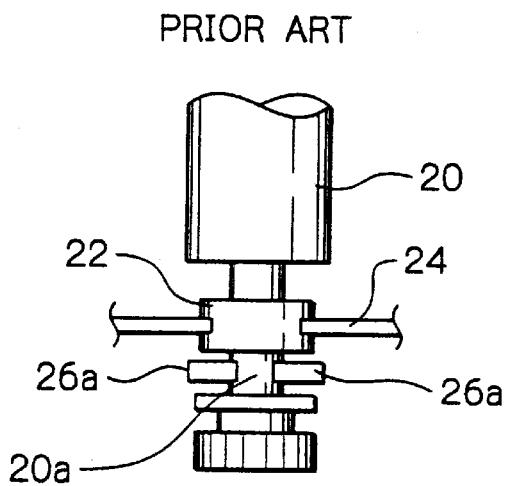
Figure 2C:
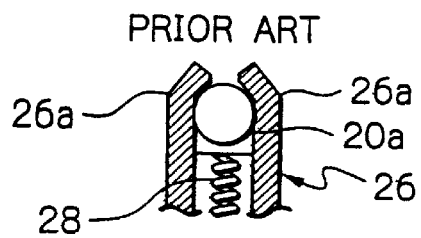

FIGS. 2A through 2C show another conventional image transfer roller device addressing the above-described problems. As shown, the image transfer roller device includes an image transfer roller 20 and a bearing 22 rotatably supporting the roller 20. A pair of ribs 24 allow the bearing 22 to move only in one direction. A pair of hook members 26, which are also formed of resin, prevent the shaft 20a of the roller 20 from slipping out with respective catches 26a. A spring 28 presses the bearing 22 such that the roller 20 is pressed against a photoconductive element not shown.

Even the configuration shown in FIGS. 2A through 2C have the following problems left unsolved. While the hook members 26 support the shaft 20a with their catches 26a, the portions of the shaft 20a contacting the catches 26a form part of a cylinder. As a result, a pressure exerted by the spring 28 tends to move the catches 26a away from each other, varying the position of the roller 20. Further, the shaft 20a tends to slip out of the hook members 26 when the catches 26a deform due to aging. While the hook members 26 may be formed of an extremely rigid material in order to solve the above problems, excessively rigid hook members make it difficult to attach and detach the roller 20, as stated earlier. In light of this, Japanese Patent Laid-Open Publication No. 6-64279, for example, proposes to use a lever or similar tool for attaching and detaching an image transfer roller.

A problem with both of the conventional configurations described above is that carrier and toner particles, as well as other impurities, enter the bearing, which supports the image transfer roller, producing noise. Moreover, toner and carrier particles scattered around the photoconductive element and a developing section are likely to deposit on the image transfer roller and then enter the bearing.

Figure 3:
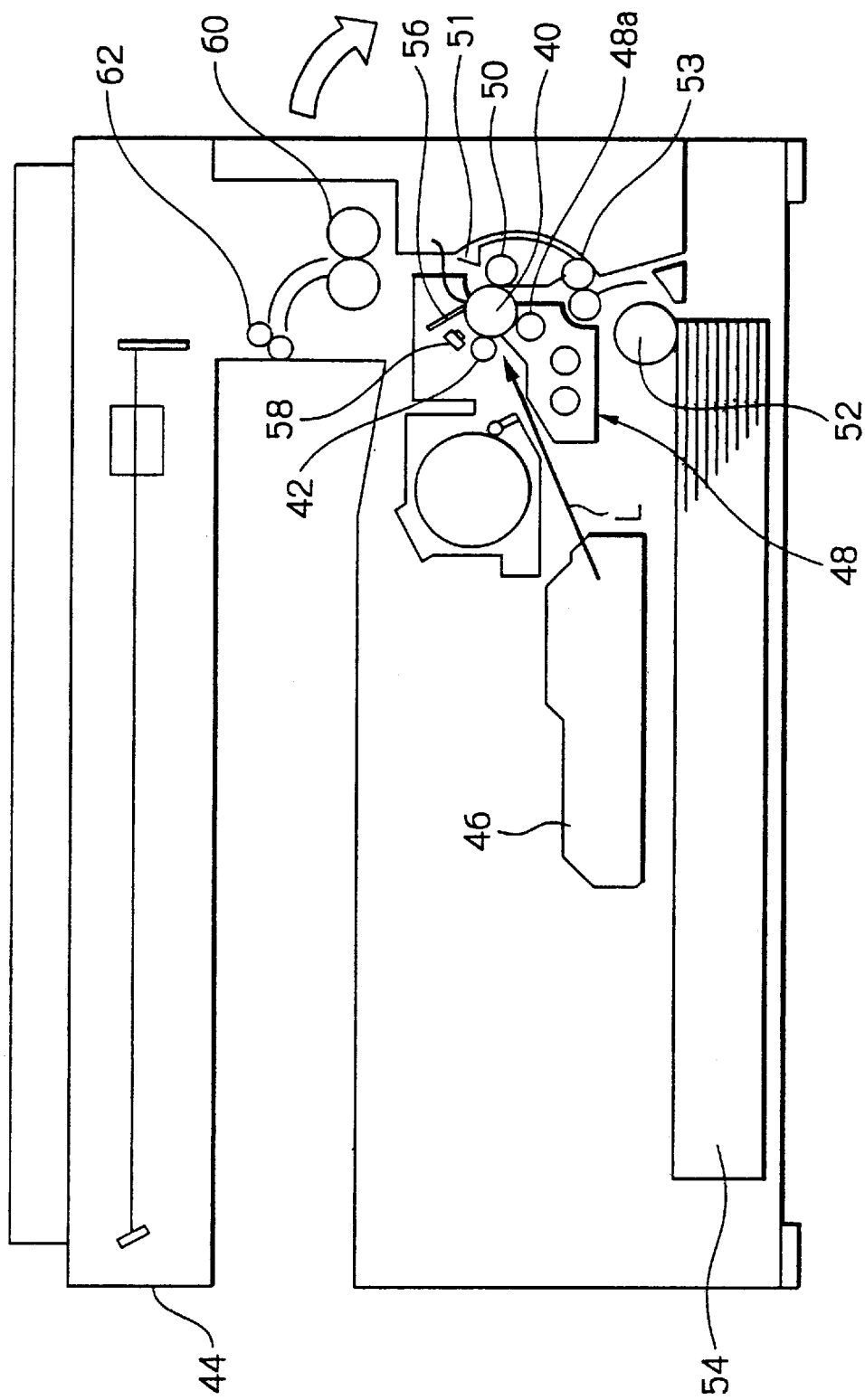
FIG. 3 is a view showing an image forming apparatus to which the present invention is applied.
Figure 4A:
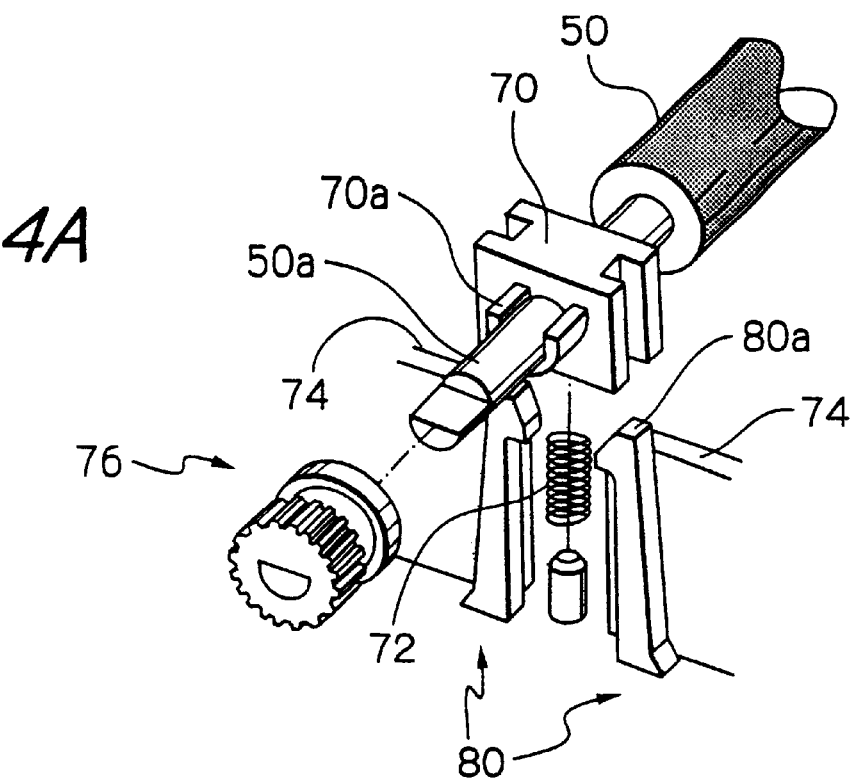
FIGS. 4A through 4C are views showing a roller device embodying the present invention.
Figure 4B:
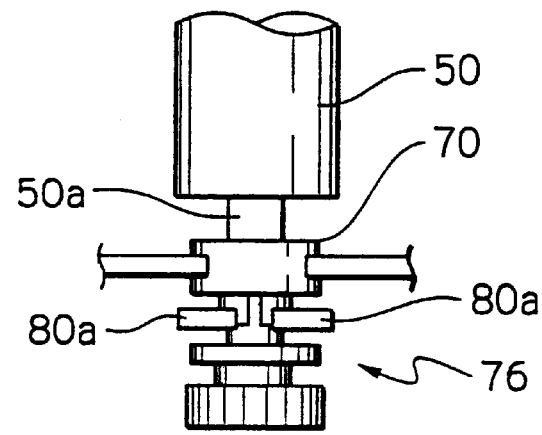
Figure 4C:
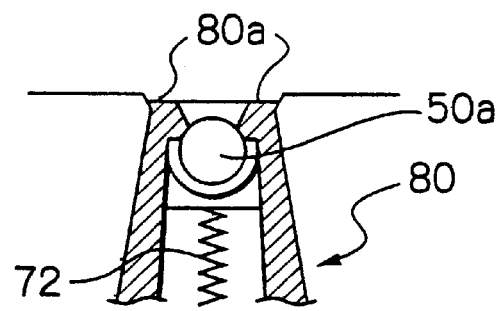

Referring to FIG. 3, an image forming apparatus to which a roller device embodying the present invention will be described. As shown, the image forming apparatus includes a photoconductive element implemented as a drum 40, which is formed of OPC (Organic PhotoConductor) or similar photoconductive substance. While the drum 40 is rotated counterclockwise, as viewed in FIG. 3, a charge roller 42 applied with a high-tension voltage uniformly charges the surface of the drum 40. A scanner 44 scans the surface of a document and outputs an image signal representative of a document image. An optical writing unit 46 scans the charged surface of the drum 40 with a laser beam L in accordance with the image signal, thereby forming a latent image on the drum 40.

A developing unit 48 includes a sleeve 48a for development and stores a toner and carrier mixture. The carrier forms a magnet brush on the sleeve 48a. While the sleeve 48a is in rotation, the toner is transferred from the magnet brush to the latent image on the drum 40 to thereby produce a corresponding toner image. The drum 40 in rotation conveys the toner image to a nip between the drum 40 and an image transfer roller 50.

A pickup roller 52 pays out a paper sheet or similar recording medium 54 toward a registration roller pair 53. The registration roller pair 53 stops the paper sheet 54 and then drives it such that the leading edge of the paper sheet 54 meets the leading edge of the toner image formed on the drum 40. As soon as the leading edge of the paper sheet 54 reaches the nip between the drum 40 and the image transfer roller 50, a bias for image transfer is applied to the roller 50 and charges the roller 50 to polarity opposite to the polarity of the toner deposited on the drum 40. Consequently, the toner image is transferred from the drum 40 to the paper sheet 54. A peeler 56 peels off the paper sheet 54 from the drum 40. The peeler 51 is applied with a bias voltage or connected to ground.

A cleaning blade 56 removes the toner left on the paper sheet 54 after image transfer. A conveyor, not shown, returns such toner to the sleeve 48a. A quenching lamp or discharge lamp 58 discharges the entire surface of the drum 40 with light to thereby prepare the drum 40 for the next image formation. The peeler 51 discharges the paper sheet 54 carrying the toner image thereon. A heat roller 60 fixes the toner image on the paper sheet 54 with heat. Finally, an outlet roller pair 62 drives the paper sheet 54 out of the apparatus.

The right wall of the apparatus, as viewed in FIG. 3, is partly openable. By opening this wall, the operator of the apparatus is capable of accessing a path between the image transfer roller 50 and the drum 40 in order to remove a jamming paper sheet. Also, the operator can replace the image transfer roller 50 by opening the above wall.

FIGS. 4A through 4D show an arrangement for rotatably supporting the image transfer roller 50 (roller 50 hereinafter) in detail. As shown, a bearing 70 rotatably supports the roller 50 and includes two lugs 70a extending in the axial direction of the roller 50. The bearing 70 is formed of POM (polyacetal, polyoxymethylene or Polyformaldehyde) resin or similar resin. Another bearing, not shown, positioned at the other end of the roller 50 is formed of conductive POM or similar conductive resin, so that a bias for image transfer can be applied to the roller 50. A spring 72 constantly biases the bearing 70 with a preselected force.

A pair of ribs 74 allow the bearing 70 to slide in only one direction, as in the conventional arrangement. The spring 72 presses the roller 50 against the photoconductive drum 40 via the bearing 70. A gear, not shown, associated with the drum 40 causes the roller 50 to rotate via a gear/roller 76. The gear/roller 76 maintains the amount of bite of the roller 50 into the drum 40 constant. In this condition, the roller 50 conveys the paper sheet 54.

A pair of elastic hook members 80 are formed of ABS (Acrylonitrile Butadien Styrene terpolymer), PC (Poly Carbonate) or similar resin. The free end of the hook members 80, i.e., catches 80a are elastically deformable in a direction perpendicular to the axis of the roller 50. The two lugs 70a of the bearing 70 respectively abut against the catches 80a of the hook members 80, preventing the bearing 70 and roller 50 from slipping out.

In the above configuration, the roller 50 is held stationary at a preselected position more accurately than in the conventional configuration. Further, the hook members 80 are prevented from deforming due to aging and causing the roller 50 to slip out. The hook members 80 can therefore serve the expected function with lower rigidity than the conventional hook members. This allows a person to easily remove the bearing 70 and roller 50 by forcing the hook members 80 away from each other by fingers.

Figure 5A:
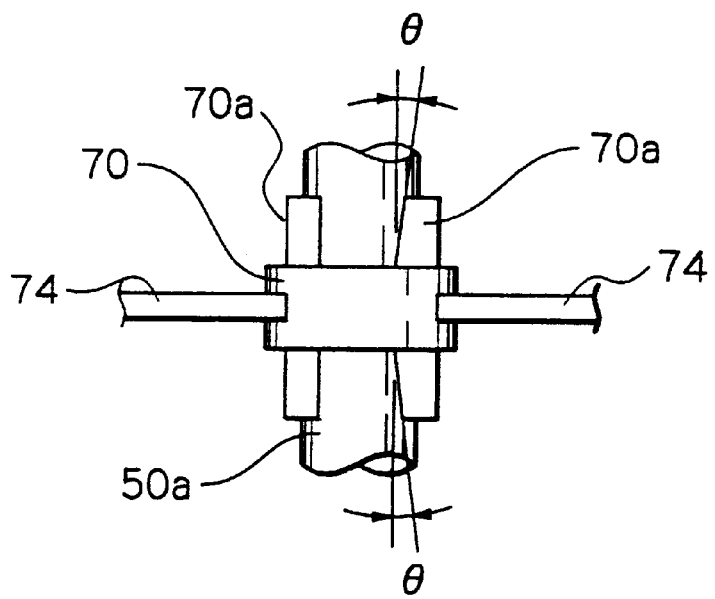
FIGS. 5A through 5C are views for describing the illustrative embodiment more specifically.
Figure 5B:
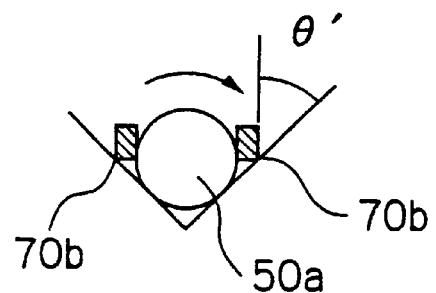
Figure 5C:
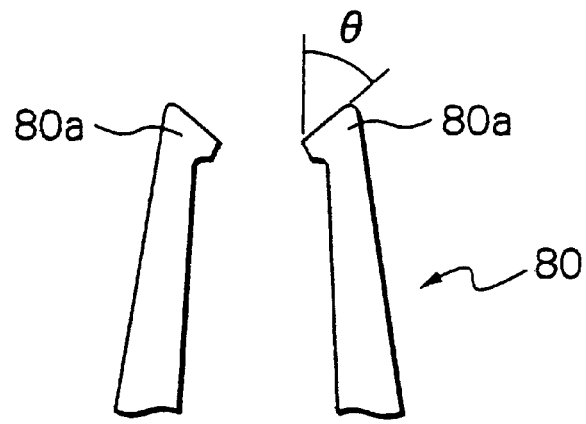

FIGS. 5A through 5C show a positional relation between the lugs 70a and the catches 80a of the hook members 80. As shown, the lugs 70b each include an inclined surface 70b lying on a line that is tangential to the roller 50. Assume that an angle between a vertical line and the inclined surface 70b is $\theta'$, and that an angle between a vertical line and the inclined surface of each catch 80a is $\theta$. Then, there holds a relation of $\theta' \leqq \theta$. This relation allows the shaft 50a of the roller 50 to be smoothly inserted between the catches 80a.

Figure 6:
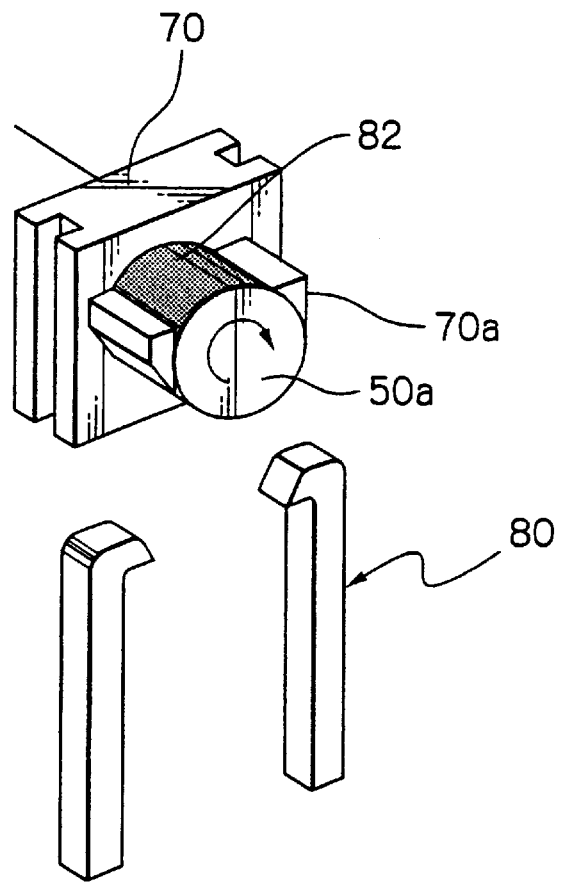
FIG. 6 is a view for describing impurities deposited on the shaft of an image transfer roller included in the illustrative embodiment.

The gap between the circumference of the shaft 50a and each lug 70a should preferably be 0 mm to 0.5 mm. In the illustrative embodiment, the gap is selected to be 0.3 mm. As shown in FIG. 6, when impurities 82 accumulate on the shaft 50a of the roller 50, the above gap prevents the impurities 82 from entering the bearing 70 in cooperation with the inclined ridge of the lug 70a, which will be described hereinafter.

As shown in FIG. 5A, the ridge of each lug 70a that faces the shaft 50a is inclined by an angle of $\theta a$ with respect to the axis of the roller 50 in the circumferential direction of the roller 50. The angle $\theta a$ is greater than zero and selected to be 3 degrees in the illustrative embodiment. In this configuration, toner, carrier and other impurities deposited on the shaft 50a are guided by the inclined ridge of the lug 27a away from the bearing 70. This prevents the impurities from entering the bearing 82 and producing noise. In FIG. 5A, the inclined ridge is positioned at both sides of the bearing 70 although it may be positioned at one side of the same.

Figure 7:
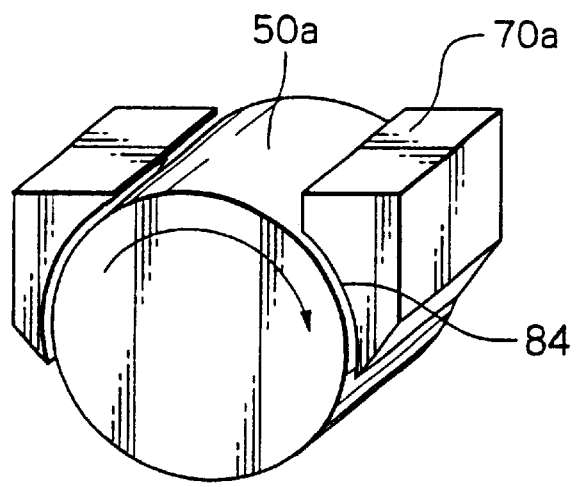
FIG. 7 is an isometric view showing an alternative embodiment of the present invention.

As shown in FIG. 7, a magnetic piece 84 is positioned between each lug 70a and the shaft 50a and spaced from the shaft 50a. The magnetic piece 84 magnetically collects the carrier deposited on the shaft 50a and prevents it from flying about. In addition, the toner deposits on the carrier collected by the magnetic piece 84. The magnetic piece 84 therefore insures a cleaning effect over a long period of time. The lug 70a itself may be formed of a magnetic material, if desired. Further, the magnetic piece 84 maybe replaced with, e.g., a piece of foam sponge or felt.

In summary, it will be seen that the present invention provides a roller device capable of facilitating the attachment and detachment of a roller with a simple configuration, accurately positioning the roller, and preventing the roller from slipping out due to aging or the deformation of hook members. Further, lugs protruding from a bearing clean the shaft of the roller and thereby prevents impurities from entering the bearing and producing noise.

Various modifications will become possible for those skilled in the art after receiving the teachings of the present disclosure without departing from the scope thereof.

What is claimed is:

1. A roller device comprising:
   a roller including a shaft;
   a bearing for rotatably supporting said shaft;
   pressing means for pressing said bearing; and
   a lug protruding from said bearing in an axial direction of said roller;
   wherein said pressing means comprises a pair of hook members deformable away from each other in a direction perpendicular to the axis of said roller.

2. The roller device as claimed in claim 1, wherein said lug includes a surface lying on a line tangential to said shaft.

3. The roller device as claimed in claim 1, wherein said lug and said shaft are spaced from each other by a gap of 0.5 mm or less.

4. The roller device as claimed in claim 1, wherein a ridge of said lug facing said shaft is inclined by an angle greater than zero degree with respect to a circumference of said shaft downstream in a direction of rotation of said shaft.

5. The roller device as claimed in claim 1, wherein said lug is at least partly formed of a magnetic material.

6. The roller device as claimed in claim 1, further comprising a cleaning member intervening between said lug and said shaft.

7. In an image transferring device including a roller device, said roller device comprising:
   a roller including a shaft;
   a bearing for rotatably supporting said shaft;
   pressing means for pressing said bearing; and
   a lug protruding from said bearing in an axial direction of said roller;
   wherein said pressing means comprises a pair of hook members deformable away from each other in a direction perpendicular to the axis of said roller.

8. The roller device as claimed in claim 7, wherein said lug includes a surface lying on a line tangential to said shaft.

9. The roller device as claimed in claim 7, wherein said lug and said shaft are spaced from each other by a gap of 0.5 mm or less.

10. The roller device as claimed in claim 7, wherein a ridge of said lug facing said shaft is inclined by an angle greater than zero degree with respect to a circumference of said shaft downstream in a direction of rotation of said shaft.

11. The roller device as claimed in claim 7, wherein said lug is at least partly formed of a magnetic material.

12. The roller device as claimed in claim 7, further comprising a cleaning member intervening between said lug and said shaft.

13. In an image forming apparatus comprising an image transferring device including a roller device, said roller device comprising:
   a roller including a shaft;
   a bearing for rotatably supporting said shaft;
   pressing means for pressing said bearing; and
   a lug protruding from said bearing in an axial direction of said roller;
   wherein said pressing means comprises a pair of hook members deformable away from each other in a direction perpendicular to the axis of said roller.

14. The roller device as claimed in claim 13, wherein said lug includes a surface lying on a line tangential to said shaft.

15. The roller device as claimed in claim 13, wherein said lug and said shaft are spaced from each other by a gap of 0.5 mm or less.

16. The roller device as claimed in claim 13, wherein a ridge of said lug facing said shaft is inclined by an angle greater than zero degree with respect to a circumference of said shaft downstream in a direction of rotation of said shaft.

17. The roller device as claimed in claim 13, wherein said lug is at least partly formed of a magnetic material.

18. The roller device as claimed in claim 13, further comprising a cleaning member intervening between said lug and said shaft.

* * * * *